Feb. 2, 1926.
T. R. WILLWERSCHEID
1,571,614
STAMPING MACHINE WITH TRANSFERABLE DIES
Filed June 19, 1925
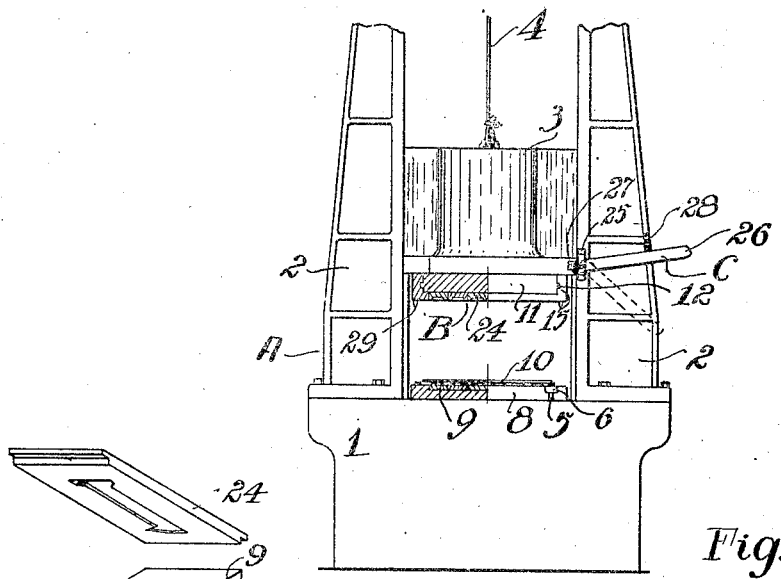
Fig. 1
Fig. 3
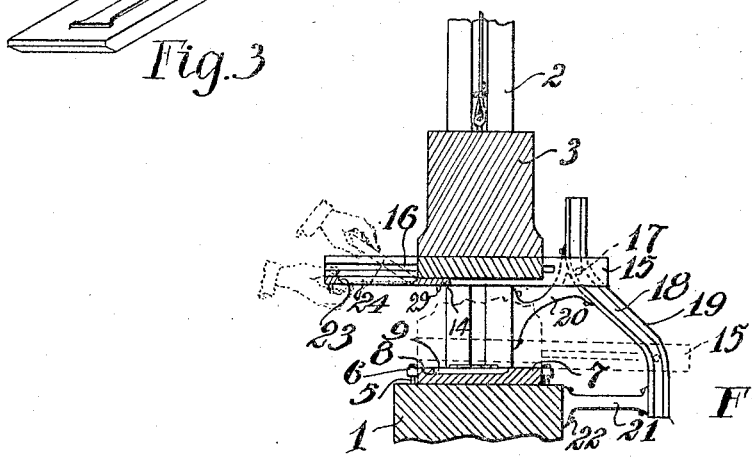
Fig. 2
Inventor
Theodor R. Willwerscheid
By  A. H. C. Johnson
Attorney Patented Feb. 2, 1926.

1,571,614

UNITED STATES PATENT OFFICE.

THEODOR R. WILLWERSCHEID, OF ST. PAUL, MINNESOTA.

STAMPING MACHINE WITH TRANSFERABLE DIES.

Application filed June 19, 1925. Serial No. 38,169.

*To all whom it may concern:*

Be it known that I, THEODOR R. WILL-WERSCHEID, a citizen of the United States, residing at St. Paul, in the county of Ramsey and State of Minnesota, have invented certain new and useful Improvements in Stamping Machines with Transferable Dies, of which the following is a specification.

The present invention relates to a die holder for a stamping machine.

In the making of embossed metal plates, such as license plates for motor cars, in which each successive plate has embossed thereon a designation which is different from each of the other plates, a common practice is to employ a die having a raised portion thereon supported upon the bed plate of a stamping machine, and to affix a rubber block to the movable member of the stamping machine. A blank sheet of metal of a required size is positioned to rest upon the raised die and the rubber block is then forcefully driven against the blank, the elasticity of the rubber block forcing the metal of the blank plate down over the die to emboss upon the blank a configuration conforming to that of the raised portion of the die. Where a heavy sheet is to be embossed, however, or where small or intricate figures are to be embossed, it is preferable to use a recessed die affixed to the movable member, having a negative configuration conforming with that of the raised portion of the lower die, so as to stamp the sheet between the two metal dies. An objection to using a recessed die in the upper movable member where each successive plate is different from the previous one has been the difficulty of changing the recessed dies for each successive stamping operation.

An object of the present invention is to make a die holder to be mounted upon a movable element of a stamping machine to firmly hold the dies during a stamping operation, and to move the dies from beneath the movable element when the movable element is raised to facilitate changing the dies.

Another object is to slidably mount a die holder beneath a movable element during a stamping operation and to remove the die from beneath the movable element upon the return of the movable element to an inoperative position to facilitate removal of the die.

Another object is to make a die holder slidably mounted upon a movable element of a stamping machine to retain a die in a required position with respect to the movable element during a stamping operation and to remove the die holder from said position upon the moving of the movable element to an inoperative position to facilitate removal of a die from the die holder.

In order to attain these objects, there is provided, in accordance with one feature of the invention, a die holder slidably affixed to the weighted hammer portion of a drop hammer, the slidable die holder having affixed thereto a roller mounted to ride in a camway affixed to the frame of the hammer. The camway is shaped to slidably move the die holder out from beneath the weighted hammer portion upon the raising of said hammer portion to an inoperative position and to move the die holder to a predetermined position beneath the weighted hammer portion during a stamping operation. The dies are retained in the die holder by a retaining ledge in the die holder which supportingly engages a projection upon each end of a die to retain it in position therein.

These and other features of the invention, not specifically mentioned, will be more fully brought out in the following description and the accompanying drawings, wherein:

Figure 1 is a view in front elevation of a drop hammer having a die holder of a well known type affixed to the bed plate thereof, and having a die holder made in accordance with the present invention affixed to the weighted hammer portion thereof, a portion of each of the die holders being shown in elevation and a portion of each being shown in section.

Figure 2 is a view in vertical section through the center of the mechanism shown in Figure 1, the parts being shown in an inoperative position in solid lines, and in an operated position in dotted lines; and Figure 3 is a view in perspective of a pair of dies used in carrying out the invention.

Referring to the drawings in detail, a drop hammer A of a well known type, comprises a base 1 with a pair of vertical uprights 2. Intermediate the uprights is a weighted hammer 3 having a cable 4 affixed thereto in a well known manner to alternately raise and drop the hammer by means of mechanism of a well known type, not shown.

Affixed to the base by means of bolts inserted in lugs 6 is a die holder 7 which comprises a solid block of steel having the central portion 8 thereof recessed to receive a plurality of dies 9. Each of the dies set in the recess 8 may be considered for the purpose of the present invention as bearing a raised numeral, and it may also be considered that it is desired to number a plurality of blanks, such as plate 10, Figure 1, with embossed numerals, the plates to be numbered in numerical succession.

A block 11 is firmly affixed to the lower face of the hammer portion 3, as by means of bolts, not shown, the block 11 having a planiform lower face and a pair of tracks 12 machined along the sides thereof parallel to the lower face of the block. A die holder B comprises a central portion 14 of a size to correspond with the lower face of the block 11 when the die holder is in an operative position thereunder, and a pair of side members 15 integral therewith, each of the side members extending rearwardly beyond the central portion and being grooved at 16 to be slidably supported upon the tracks 12 affixed to the block 11. Each of the side members 15 has affixed thereto a roller 17 extending laterally therefrom to lie in a camway 18, which may be cut in a steel member 19, firmly affixed in position as by brackets 20 and 21 secured to the frame of the machine A as by bolts 22. The central portion of the die holder B is cut away, a step 23 being provided at either end of the cut away portion to support a die 24 thereon. Each of the dies contained in the upper die holder B is shaped to have a negative configuration with respect to the die 9, correspondingly positioned in the lower die holder 8, a pair of dies, consisting of one upper and one lower die, being shown in Figure 3. The dies in Figure 3 are shown as disposed at an angle to each other to show the method of constructing the dies.

A lock C to hold the hammer portion 3 in a raised position during a die changing operation, may comprise a bracket 25 to which a bar 26 is pivotally connected, the bar 26 having the inner end thereof shaped to engage a projection 27 integrally connected to the weighted hammer portion 3. A stop 28 is connected to the upright 2 to hold the bar 26 in the solid line position shown in Figure 1 to support the hammer portion 3. To release the hammer from its supported position upon the bar 26, the hammer 3 is raised slightly by the operative mechanism therefor, whereupon the weight of the outer end 26 of the support bar, being greater than that of the inner portion, causes the support bar to drop to the dotted line position shown in Figure 1 to free the hammer for downward movement.

The operation of the device is as follows:

The weighted hammer portion is raised to a point slightly higher than that indicated in solid lines in Figure 1, the roller 17 riding in the camway 18, moving the die holder B to the solid line position shown in Figure 1. The handle 26 is then manually moved to the solid line position shown in Figure 1 and the hammer is lowered to rest on the inner end of bar 26 to support the hammer in a raised position. The die 24 may then be manually removed, as shown in Figure 2, and a die having a numerical designation one higher than the previous one may be inserted in lieu thereof. The lower die 9 corresponding therewith may also be exchanged for one having a numerical designation thereon corresponding to that of the new die 24. The weighted hammer portion may be released by raising it from its supported position upon the locking member 26, whereupon the locking member drops to the dotted line position in Figure 1, as previously described to free the hammer for downward travel. The hammer may then be released for an operative blow in a well known manner, the upper die holder B being moved to the dotted line position in Figure 2 by means of the roller 17 riding in the camway 18 during the downward movement of the weighted hammer portion. Dowel pins 29 of a type commonly employed in stamping machines are provided to insure registration of the dies upon impact. When the upper die strikes the blank plate 10 the die will be in the dotted line position as shown in Figure 2 to register with the lower die to emboss the plate. The hammer may be then raised to the solid line position shown in Figure 1 and locked in that position, the dies again changed, and a new blank plate inserted, and the operation repeated.

The provision of a pair of dies instead of a single raised die and a rubber block as previously described gives a sharper and more uniform embossing and permits the stamping of heavier sheets and the use of smaller dies than with the rubber block process. This is due to the fact that the elastic force of the rubber is not sufficient to drive a heavy sheet of metal into the recesses of a die when a heavy sheet of metal is used; and also when a die having a small configuration thereon is employed, the rubber will not properly flow into the recesses of the die since the elasticity of the rubber resting upon the raised portion retains it from such flow.

What I claim is:

1. A mechanism of the character described, having a fixed element and a movable element, a die holder affixed to the stationary element, and a die holder slidably connected to the movable element, said second die holder having die retaining means therein to be moved adjacent the movable element during an operation thereof to lock a die in the die holder, and to be moved laterally beyond the movable element when said movable element is returned to an unoperated condition, to free the die for removal.

2. A mechanism of the character described, having a die holder connected to a fixed element of a stamping machine, a second die holder slidably mounted on a movable element thereof, and cam means operatively associated with the second die holder to move the second die holder to an operative position during an operation of said movable element to lock a die against an operative face of the movable element, and to slidably move the second die holder beyond the movable element when said movable element is returned to an unoperated condition to free the die for removal.

3. A mechanism of the character described, having a die holder affixed to a stationary element thereof, a second die holder slidably connected to a movable element thereof, said second die holder having an opening therein to supportingly contain a die, and cam means operatively associated with the second die holder to move it into registry with the first die holder during an operation of the movable element to lock a die in the second die holder, and to move the second die holder laterally with respect to the movable element during a return of the movable element to an unoperated condition, to free the die for removal.

4. A mechanism of the character described, comprising a die holder connected to a fixed element of a stamping machine, a second die holder slidably connected to a stamping element of said stamping machine, and cam means connected to the stamping machine and operatively associated with the second die holder to move the second die holder, to lock a die contained therein against an operative face of the movable element during a stamping operation, and to move the second die holder laterally beyond the operative face of the movable element upon a return of the movable element to an unoperated condition to free the die for removal.

In testimony whereof I affix my signature.

THEODOR R. WILLWERSCHEID.